March 5, 1946. K. C. BUGG 2,396,082
RIVETING OR FASTENING MECHANISM
Filed July 27, 1942 2 Sheets-Sheet 2
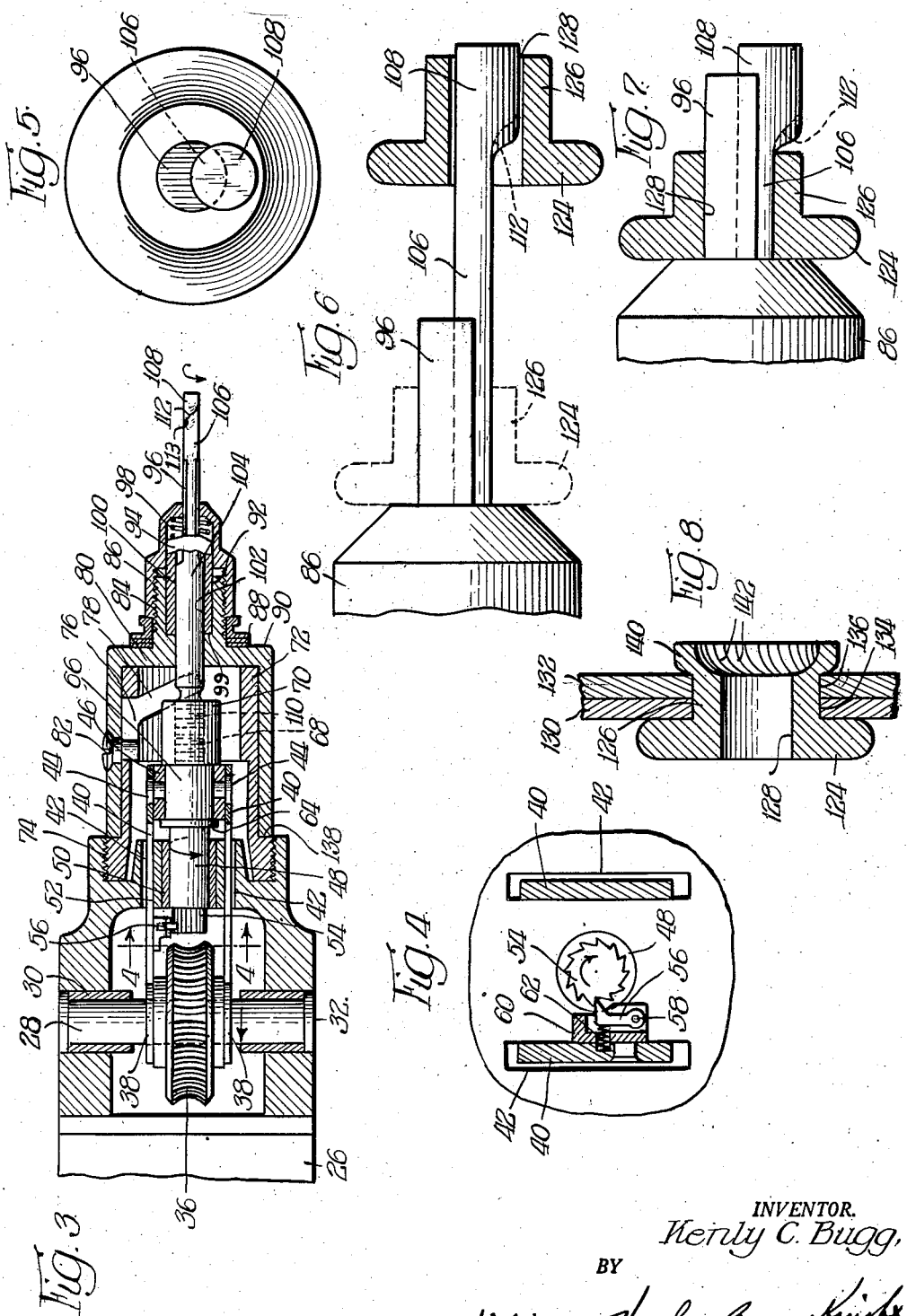
INVENTOR.
Kenly C. Bugg,
BY Patented Mar. 5, 1946

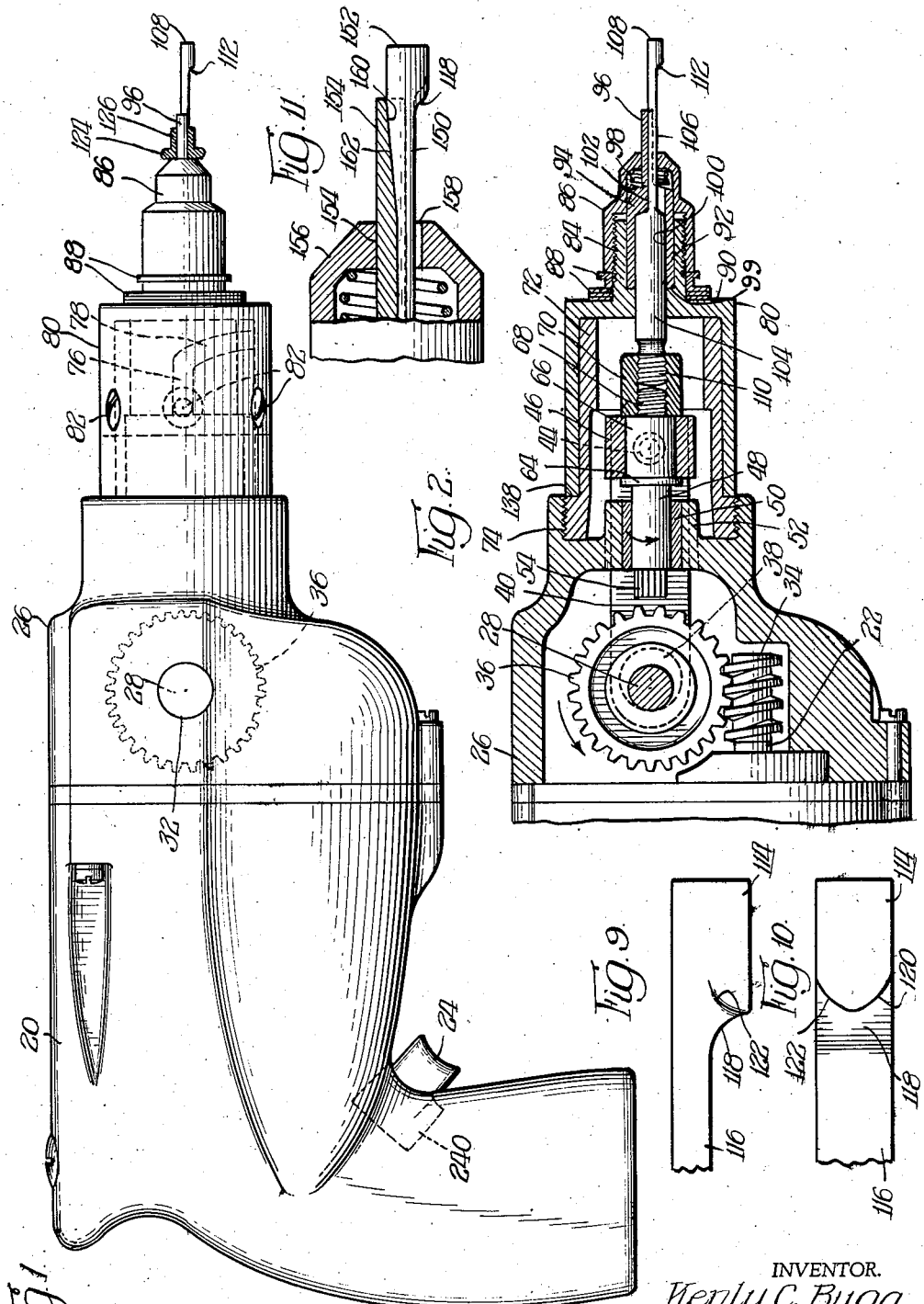

2,396,082

UNITED STATES PATENT OFFICE 2,396,082

RIVETING OR FASTENING MECHANISM

Kenly C. Bugg, Fort Wayne, Ind.

Application July 27, 1942, Serial No. 452,494

15 Claims. (Cl. 218—19)

This invention pertains to fastener setting mechanism.

It is an object of this invention to provide a device for setting fasteners by reciprocating and step-by-step rotating means.

Another object is to provide mechanism to rotate reciprocating means for setting fasteners.

Still another object is to provide mechanism for setting blind fasteners, the member for forming the point thereof or for setting the fastener being of substantially the same diameter as the passage through said fastener.

Yet another object is to provide mechanism for setting blind fasteners from only a single side wherein the point forming or setting means is so designed that it positions the fastener in place (as in aligned apertures), it points the fastener, and it so disposes the metal of the fastener as the point is being formed that there is no tendency to bind the point forming means of the mechanism.

A further object is to provide mechanism for setting blind fasteners wherein the point forming means is so constructed and arranged that it is always maintained in the most favorable position and path for forming the point.

A yet further object is to provide mechanism for setting blind fasteners wherein the point forming means comprises a filling member and an adjacent point forming member, the filling member providing reenforcing and bearing means to prevent lateral dislocation of said point forming member during operation.

Another further object is to provide mechanism for setting fasteners by reciprocating means wherein the setting means is repositioned in a step-by-step manner until the setting is finally effected.

Another object is to provide mechanism for setting fasteners by reciprocating means wherein the setting means is repositioned in a step-by-step manner until the setting is finally effected, the step-by-step movement occurring only at the time the setting means is disengaged from the fastener.

Another object is to provide mechanism for setting or pointing blind hollow fasteners wherein the fastener may be readily and easily positioned on the tool prior to setting, readily applied to the members to be secured, pointed by a reciprocating squeezing motion, the setting being effected by a head adapted to be positioned through small step-by-step increments and controlled so that the point is finally formed, thus preventing fracture, work hardening, or other undesirable conditioning of the fastener.

Another object is to provide mechanism for setting or pointing blind hollow fasteners wherein the pointing is effected by step-by-step squeezing operations controlled from the side of the fastener opposite the point, whereby the fastener is provided with walls of sufficient thickness to insure the provision of resistance to shear before tubular collapse.

Another object is to provide portable mechanism for readily setting fasteners of high alloys or other suitable materials without fracturing, work hardening or undesirably upsetting the material of said fastening.

Another object is to provide mechanism for readily setting hollow blind fasteners having relatively small holes therethrough to maintain a maximum wall thickness and shank strength, said mechanism comprising a setting member and a cooperating hole filling member, the setting member having an enlarged setting head or end of substantially the same diameter or width as the diameter of said holes, said members being so movable that first the head is insertable through a hole, then both members are disposed through said hole, this construction maintaining the maximum strength of said members but permitting the largest head to be used for setting the fastener.

Another object of the invention is to provide a fastener setting device which is adapted to operate at different speeds for setting different purpose fasteners such as are used in the making of aeroplanes; that is, it is sometimes desirable to set a fastener slowly to obtain better filling of the holes of the parts joined, and at other times quick fastening is permissible to obtain proper fastening.

With these and various other objects in view, the invention may consist of certain novel features of construction and operation as will be more fully described and particularly pointed out in the specification, drawings and claims appended hereto.

In the drawings, which illustrate embodiments of the device, and wherein like reference characters are used to designate like parts—

Figure 1 is a side elevation of riveting or fastening mechanism embodying the invention, showing the parts in position to receive the fastener;

Figure 2 is a fragmentary sectional side elevation of the operating and setting mechanism of the mechanism shown in Figure 1;

Figure 3 is a fragmentary sectional top plan view of the mechanism illustrated in Figure 2 but with the tool shank 106 revolved 180° from the position shown in Figure 1;

Figure 4 is an enlarged fragmentary transverse sectional elevation taken substantially in the plane as indicated by the line 4—4 of Figure 3;

Figure 5 is an enlarged end elevation of the mechanism illustrated in Figures 1, 2 and 3;

Figure 6 is an enlarged fragmentary side elevation of the setting and positioning mechanism in the position illustrated in Figure 2, showing the application of a fastener thereto;

Figure 7 is an enlarged fragmentary side elevation of the fastening and positioning mechanism illustrated in Figure 6 showing the parts in position for setting a fastener;

Figure 8 is an enlarged fragmentary sectional elevation showing a fastener after it has been set in position or pointed for holding a pair of plate or skin members;

Figure 9 is an enlarged fragmentary side elevation of a modified form of squeezer end;

Figure 10 is a fragmentary bottom plan view of the form of squeezer end shown in Figure 9.

Figure 11 is a fragmentary sectional elevation through the nose of another form of fastening mechanism embodying the invention.

In the embodiment of the tool shown in Figures 1 to 8 inclusive, a casing 20 encloses a motor (not shown), said motor being provided with the motor shaft 22 and being adapted to be operated by means of the switch (not shown) controlled by the trigger 24. In order to vary the speed of the motor to control the speed of setting a fastener, the rheostat 240 may be provided. The casing 20 is provided with the end housing 26 in which the shaft 28 is journaled as at 30. The closures 32 are provided for preventing access of foreign matter to the journals of said shaft, it being understood of course that the closures and the journals may be integral. The motor shaft 22 is provided with the worm 34 adapted to drive the worm gear 36 in a counter-clockwise direction as viewed in Figure 2, that is, in the direction of the arrows illustrated in Figures 2 and 3. In order to change the speed of the device for selectively setting a fastener, it is understood that the worm 34 and gear 36 may be changed as well as the rheostat used. The worm gear 36 is provided with the eccentrics 38 journaled in the straps 40, said straps extending through slots 42 provided in the end housing 26 and being pivoted at their forward ends as at 44 to the connecting block 46, said block being provided with the shaft 48 journaled therein, said shaft extending through the bearing 50 provided in the boss 52 of the housing 26 and being provided at its end with the ratchet 54. One of the straps 40, to wit, the left one as viewed in Figures 3 and 4, is provided with the pawl 56 pivoted as at 58 to the housing 60, said housing being secured to said strap 40, said pawl being engaged by the expansion spring 62 urging said pawl toward the ratchet.

It will be seen that rotation of the worm gear 36, in the direction of the arrows as illustrated in Figures 2 and 3, will cause the pawl to rise and fall as the rotating eccentrics 38 oscillate the straps 40 about their pivot points 44 to intermittently rotate the ratchet during the periods that the straps 40 move from their intermediate to their forward position (farthest right position as viewed in Figures 2 and 3) and back to their intermediate position, that is, while the eccentrics rise from their lowest to their highest position. This rotation of the ratchet under the influence of the eccentric is in the direction of the arrows as illustrated in Figures 2, 3 and 4. The shaft 48 is provided with the shoulder 64 which abuts the block 46, and said shaft is provided with the portion 66 extending through said block and being provided with the threaded end portion 68 adapted to be threaded into the sleeve 70, said sleeve 70 abutting the block 46 whereby said block is positioned between the sleeve and the shoulder 64. The end housing member 72 is threaded or otherwise secured as at 74 to the housing 26, said end housing member 72 being provided with the axial slots 76 which extend away from the motor a predetermined distance and communicate with helical slots 78 which extend forwardly and circumferentially a predetermined distance. The lead of the helix is determined by the work to be done, that is, the harder the work, the slower the lead.

A movable end housing 80 is slidably mounted on the end housing 72 and is provided with the inwardly projecting pins 82 (three in number being shown) engageable in and adapted to be moved along the slots 76 and 78 (one of said slots being shown in Figures 1 and 3, the others being omitted for the sake of clearness) whereby the housing 80 is moved and rotated in accordance with the travel of the pins 82 along said slots. The housing 80 is threaded or otherwise secured as at 84 to the nose 86.

The position of the nose 86 is determined by the spacers 88 placed between the nose 86 and the shoulder 90 provided on the housing 80, it being understood of course that any number or type of spacers may be used. The housing 80 is provided with the recess 92 for the reception of a body portion 94 of the bearing filling member 96, said bearing filling member projecting outwardly of the nose a predetermined distance, preferably a distance greater than the depth of the fastener to be set, and the spring 98 is interposed between the nose and the body portion 94 of the bearing filling member urging said bearing filling member rearwardly to maintain said bearing member in contact with the shoulder 99 of housing 80.

The body portion 94 is provided with the bores 100 and 102 through which the body 104 and the elongated stem or shank 106 of the squeezer end 108 extend. Said body 104 is threaded as at 110 for securing said squeezer end to the sleeve 70 whereby the squeezer end is adaptd to be reciprocated and rotated with the shaft 48. The squeezer end 108 is preferably circular in top plan as shown in Figure 5. The diameter of said circular portion may be substantially the same as the inner diameter of the fastener to be set (Figure 6). An optimum of strength of the shaft 106 and overhang of the squeezer end 108 is attained when the top edge of the end 108 passes substantially through the center of the bore of the nose 86 through which the filling member 96 and the shank 106 extend. The bearing filling member 96 is substantially moon-shaped, that is, it embraces a portion of the stem 106 as illustrated in Figure 5. The squeezer end is provided at its rear with a downwardly and forwardly directed squeezing face 112 which is disposed at an angle to the axis of the shank 106 as indicated at 113 (Figure 3) resulting in a face so disposed that the rearmost portion thereof is farther from the front end of squeezer 108 than the forward portion thereof as shown in Figure 3, i. e., the rearmost portion of the squeezer end is so disposed that the metal of the fastener is squeezed rearwardly and in the direction of rotation of the shank 106 as the end reciprocates and rotates. Said curved portion or squeezer face has an optimum of lead and pitch for a purpose to be later described.

In Figures 9 and 10 there is shown a modified form of squeezer end and shank, said squeezer end 114 corresponding to the squeezer end 108 and being mounted on the stem or shank 116 corresponding to the shank 106. In this case the squeezer end is similar in side elevation to the end 108 and is provided with the downwardly and forwardly curved portion 118 (Figure 9) joining the lower portion of the squeezer end to the shank, but said end is provided with the oppositely forwardly disposed curved faces 120 and 122 (Figure 10). The curved faces 120 and 122 may, of course, be straight if desired. The slope of said surfaces is determined with an optimum of lead and pitch. In some instances, of course, it is understood that the surface corresponding to the surfaces 120 and 122 may be normal to the axis of the shank 116, but this is not the most desirable. Other shapes may be given to the surface 112 or the surfaces 120 and 122 which will fulfill the requirements of fastener setting to be later described.

In the modification shown in Figure 11, the stem 150 corresponding to stem 106 is provided with the squeezer end 152, corresponding to the ends described above, and the bearing filling member 154 is disposed adjacent said stem in a manner similar to member 96. The stem and filling member are operated by mechanism as already described, and extend through an elongated aperture 158 in the nose 156. The stem 150 is provided with the cam surface 160 engaging a complementary cam surface 162 provided on the filling member 154 whereby when said end 152 reciprocates it will also spring outwardly or radially as it rotates to enlarge the point of the fastener as it is being set, and also to apply lateral force to the shank of the fastener to insure a tight fit of the fastener shank in the apertures of the means fastened as the plates 130 and 132.

The fastener illustrated is a hollow fastener comprising the head 124 and the shank 126, said head and shank being apertured as at 128, which aperture may for some conditions be such as to establish the walls of the shank at a thickness for maximum shear stress without tubular collapse. Of course it is understood that any desired wall strength may be provided. In some types of work, however, such as aeroplane work, maximum shear is desirable.

When it is desired to set said fastener to hold sheets, such as the sheets 130 and 132 (Figure 3), it being understood that said sheets are apertured as at 134 and 136, the sleeve 80 is moved rearwardly toward the casing 26 until it abuts the shoulder 138 provided on the housing 72, if it is not already in such position. In that position the pins 82 are in the rearmost position in the slots 76 such as illustrated in Figures 1 and 3. In this position the face 112 of the squeezer end 108 (or 114 or 152) is positioned beyond the end of the bearing filling member 96 (or 154) a distance at least as great as the length of the fastener. This is insured by virtue of the fact that the spring 98 always urges the bearing filling member 96 in a rearward direction to contact shoulder 99, yet no damage will be done to the bearing filling member or the body member 104, should it engage the member 94 in its forward movement as the spring permits slight forward movement of member 94. Further, the spring compensates for the spacers 88, i. e. no matter if spacers are or are not used, the filling member is always urged in a rearward direction permitting application of the fastener as herein described. The fastener may then be slipped over the squeezer end 108 as shown in full lines in Figure 6 and moved downwardly and behind the squeezer end to the position as shown in full lines in Figure 1 and in the dotted lines in Figure 6, that is, to where the head 124 of the fastener abuts the nose 86. In this position the fastener may be inserted in the apertures 134 and 136 to a position where the head 124 abuts the adjacent plate 130, after which, while sleeve 80 is manually held pressed against the head of the rivet, casing 26 is manually pulled away from said rivet causing the straight grooves 76 to move past pins 82 and bring face 112 into contact with the rivet shank (Fig. 7) and to bring the rear ends of the curved grooves 78 up to pins 82.

Thereafter operation of the trigger 24 permits operation of the motor which causes rotation of the motor shaft 22. Rotation of the motor shaft 22 causes the worm 34 to rotate the worm gear 36, causing the cams 38 to reciprocate the links 40. Reciprocation of the links 40 reciprocates the block 46 and consequently the shaft 48. Inasmuch as the links 40 are pivoted at their forward ends to the block at 44 and are fitted to the eccentrics 38 at their opposite ends, and inasmuch as the shaft 48 is slidably journaled as at 50, the ends of the links at the eccentric will oscillate, causing the pawl 56 to rise and fall and thus to intermittently rotate the ratchet 54, thereby rotating the shaft 48 during the periods of time links 40 move from their intermediate position to their forward position and back to their intermediate position, and consequently, as the squeezer end is reciprocating through the forward half of its orbit and rotated, said end 108 is rotated when its face 112 (or curved portion 118) is not engaged with the shank of the fastener. As the squeezer end 108 is being constantly reciprocated and periodically rotated, the sleeve 72 is moved manually rearwardly along the sleeve 80 by holding sleeve 80 and pulling the handle of the casing away from the fastener, causing the slots 76 and 78 to move along the pins 82. This movement of the sleeve has the effect of bringing the squeezer face 112 (120—122) toward the flange end of the fastener (rivet) such as illustrated in Figure 7, and continued reciprocation and rotation of the squeezer end causes a squeezing of the shank of the rivet to the position as shown at 140 in Figure 8 as sleeve 72 is retracted, the marks or ridges formed by the squeezer end being shown in exaggeration as at 142.

The fastener will have no tendency to cock or be otherwise displaced, inasmuch as the filling member 96 is in effect splined to the stem 106 of the squeezer end (Figure 5), and therefore moves around with said squeezer end. As before pointed out in reference to the angularity of face 112—113, it is preferable that the face 112 (120 and 122) be not disposed in a plane normal to the axis of the stem 106 because, since by disposing said faces as illustrated, the metal is not only squeezed downwardly toward the plates secured but it is squeezed forwardly, that is, in the direction of rotation of the squeezer end, and of course the ultimate result is that said metal is squeezed outwardly to form the point of the fastener as illustrated at 140. Thus as the fastener is positioned in the hole, there is no tendency for the metal to seize or pinch the squeezer end during movement of the end, nor will that portion of the shank within the holes of the material to be joined be crowded against the members 106 and 96 which would cause binding, all of which would be very undesirable, as can readily be appreciated. When the construction shown in Figure 11 is used, reciprocation of the end 152 causes a wider flange to be formed, i. e., one of greater diameter due to the fact that the end 152 has an outward or radial movement, caused by cams 160 and 162, as well as a reciprocatory and step-by-step rotary movement during the formation of the point of the fastener.

After the fastener has been pointed or set, as shown in Figure 8, the trigger 24 is released causing the motor switch to be opened whereupon the motor ceases to cause reciprocation of the squeezer end. The tool may be dissociated from the fastener by moving the casing 20 toward the plates 130—132, causing the housing 80 to be engaged by the shoulder 138 of housing 72, i. e., the tool will be in the position as shown in Figure 2 where the squeezer end is projected outwardly of the filler member 96 permitting the operator to remove the tool from the fastener by pulling the tool away from the fastener while working the squeezer end through the aperture in the fastener.

It is to be understood that I do not wish to be limited by the exact embodiments of the device shown, which are merely by way of illustration and not limitation as various and other forms of the device will of course be apparent to those skilled in the art without departing from the spirit of the invention or the scope of the claims.

I claim:

1. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, a section through said filling and reciprocating members being of substantially the same section as the aperture through said fastener, an enlarged fastener engaging end on said reciprocating member of substantially the same section as the aperture through said fastener, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, and means for rotating and reciprocating said enlarged end and for rotating said filling member whereby said end of said fastener is formed.

2. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, a section through said filling and reciprocating members being of substantially the same section as the aperture through said fastener, an enlarged fastener engaging end on said reciprocating member of substantially the same section as the aperture through said fastener, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, and means for rotating and reciprocating said enlarged end and for rotating said filling member whereby said end of said fastener is formed, said last named means comprising a rotating and reciprocating shaft, and means for rotating and reciprocating said shaft.

3. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable members, said bearing filling member having a portion projecting through the aperture of said nose member and beyond said nose member, a reciprocating member extending through said movable and nose members and beyond the end of said filling member, a section through said filling and reciprocating members being of substantially the same section as the aperture through said fastener, an enlarged fastener engaging end on said reciprocating member of substantially the same section as the aperture through said fastener, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, means for rotating and reciprocating said enlarged end and for rotating said filling member whereby said end of said fastener is formed, said last named means comprising a rotating and reciprocating shaft operatively associated with said reciprocating member, a rotatable eccentric, a strap pivoted with respect to said shaft and oscillated and reciprocated by said eccentric, and means between said shaft and eccentric for step-by-step rotating said shaft.

4. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, a section through said filling and reciprocating members being of substantially the same section as the aperture through said fastener, an enlarged fastener engaging end on said reciprocating member of substantially the same section as the aperture through said fastener, said movable member being adapted to move between two positions relatively to said stationary member, one position permitting the fastener to be moved over said enlarged end to a position seated on said nose member and embracing said filing and reciprocating members, the second position relatively moving said bearing filling and reciprocating members to a position where said enlarged end may engage and form the adjacent end of the fastener, and means for rotating said enlarged end a predetermined distance and then reciprocating said enlarged end whereby said end of said fastener is formed.

5. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, a section through said filling and reciprocating members being of substantially the same section as the aperture through said fastener, an enlarged fastener engaging end on said reciprocating member of substantially the same section as the aperture through said fastener, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, means for rotating said enlarged end a predetermined distance and then reciprocating said enlarged end whereby said end of said fastener is formed, said last named means comprising a rotating and reciprocating shaft operatively associated with said reciprocating member, an oscillating and reciprocating member pivoted with respect to said shaft, means for oscillating and reciprocating said last named member, and means between said shaft and oscillating and reciprocating member for rotating said shaft a predetermined amount for a certain oscillatory movement of said oscillating and reciprocating member.

6. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, an enlarged fastener engaging end on said reciprocating member, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, and means for rotating and reciprocating said enlarged end and for rotating said filling member whereby said end of said fastener is formed.

7. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, an enlarged fastener engaging end on said reciprocating member, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, means for rotating and reciprocating said enlarged end and for rotating said filling member whereby said end of said fastener is formed, said last named means comprising a rotating and reciprocating shaft, and means for rotating and reciprocating said shaft.

8. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, an enlarged fastener engaging end on said reciprocating member, said movable member, being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, and means for rotating said enlarged end a predetermined distance and then reciprocating said enlarged end whereby said end of said fastener is formed.

9. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, an enlarged fastener engaging end on said reciprocating member, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, means for rotating said enlarged end a predetermined distance and then reciprocating said enlarged end whereby said end of said fastener is formed, said last named means comprising a rotating and reciprocating shaft operatively associated with said reciprocating member, an oscillating and reciprocating member pivoted with respect to said shaft, means for oscillating and reciprocating said last named member, and means between said shaft and oscillating and reciprocating member for rotating said shaft a predetermined amount for a certain oscillatory movement of said oscillating and reciprocating member.

10. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, an enlarged fastener engaging end on said reciprocating member, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, means for rotating said enlarged end a predetermined distance and then reciprocating said enlarged end whereby said end of said fastener is formed, said last named means comprising a rotating and reciprocating shaft operatively associated with said reciprocating member, an oscillating and reciprocating member pivoted with respect to said shaft, means for oscillating and reciprocating said last named member, and pawl and ratchet mechanism between said shaft and said oscillating and reciprocating member for rotating said shaft a predetermined amount for a certain oscillatory movement of said oscillating and reciprocating member.

11. A tool for setting a substantially tubular fastener, said tool including a casing provided with a relatively stationary member, a relatively movable member slidably mounted on said stationary member, means for limiting movement of said movable member, an apertured nose member provided on said movable member, a bearing filling member rotatably mounted with respect to said nose member and movable with said movable member, said bearing filling member having a portion projecting through the aperture of said nose member and beyond said nose member, a reciprocating member extending through said movable and nose members and beyond the end of said filling member, an enlarged fastener engaging end on said reciprocating member, said movable member being adapted to move between two positions relatively to said stationary member, one position permitting the fastener to be moved over said enlarged end to a position seated on said nose member and embracing said filling and reciprocating members, the second position relatively moving said bearing filling and reciprocating members to a position where said enlarged end may engage and form the adjacent end of the fastener, and means for selectively rotating and reciprocating said enlarged end at varying speeds whereby said end of said fastener is formed.

12. In combination, a tool provided with a rotating and reciprocating end, said end having an enlarged portion for impinging against a fastener for forming a portion thereof into a predetermined shape, a filling member embracing a portion of said end and rotatable therewith, and means for rotating said end a predetermined amount and then reciprocating said end to cause said enlarged portion to squeeze a portion of said fastener into a predetermined shape, said enlarged portion having a fastener engaging surface diagonally disposed with respect to the axis of the end to squeeze the fastener portion being formed in a direction forwardly of the direction of rotation of said enlarged portion.

13. In combination, a tool provided with a rotating and reciprocating end, said end having an enlarged portion for impinging against a fastener for forming a portion thereof into a predetermined shape, a filling member embracing a portion of said end and rotatable therewith, and means for rotating said end a predetermined amount and then reciprocating said end to cause said enlarged portion to squeeze a portion of said fastener into a predetermined shape, said enlarged portion having a sloping fastener engaging surface, sloping upwardly and outwardly from the tool to squeeze the fastener end being formed in a predetermined manner ahead of the direction of rotation of the end whereby the tendency of the enlarged portion to stick is obviated.

14. In a tool for setting fasteners having a substantially tubular opening therethrough, the combination of a casing, a tool end provided on said casing and adapted to reciprocate and rotate with respect to said casing, means in said casing for rotating and reciprocating said end, said end being insertable through the fastener and being provided with an enlarged portion adapted to overlie the inset edge of said fastener and to impinge upon said edge for setting said fastener, a housing member slidably mounted on said casing and having an end for engaging said fastener to hold it in place while being set, said housing member having a filler member movable thereby to move along said tool end whereby a portion of the tool end and said filler member are disposed in the opening of the fastener, the filler member and tool end within the opening substantially filling said opening, movement of said housing member being adapted to move the tool end to a position to set said fastener.

15. A tool for setting a substantially tubular fastener, said tool being provided with a rotating and reciprocating end, said end having a shank adapted to extend through the fastener and having an enlarged portion at the end of the shank for impinging against the fastener for forming a portion thereof into a predetermined shape, a section through said enlarged portion transversely of the axis of said end being of substantially the same size as the hole through the fastener, a filling member adapted to extend into the fastener with said shank after the enlarged portion has been inserted through the hole of the fastener for substantially filling the hole of the fastener with the shank during the setting or forming operation, said filling member embracing a portion of said shank and being rotatable with said end, a section through said shank and filling member being of substantially the same size and shape as the fastener hole, and means for rotating and reciprocating said end, said end acting to rotate said filling member, said end reciprocating a plurality of times in a step-by-step manner during each revolution thereof.

KENLY C. BUGG.